US007184880B2

(12) United States Patent
Haluska

(10) Patent No.: US 7,184,880 B2
(45) Date of Patent: Feb. 27, 2007

(54) METHOD AND DEVICE FOR DETERMINING THE PHASE POSITION OF A CAMSHAFT OF AN INTERNAL COMBUSTION ENGINE

(75) Inventor: Peter Haluska, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 10/537,239

(22) PCT Filed: Sep. 27, 2004

(86) PCT No.: PCT/EP2004/052326

§ 371 (c)(1), (2), (4) Date: May 31, 2005

(87) PCT Pub. No.: WO2005/038225

PCT Pub. Date: Apr. 28, 2005

(65) Prior Publication Data

US 2006/0136118 A1 Jun. 22, 2006

(30) Foreign Application Priority Data

Oct. 13, 2003 (DE) ................................ 103 47 516

(51) Int. Cl.
*G01M 15/05* (2006.01)
*F02D 41/00* (2006.01)

(52) U.S. Cl. .................... 701/114; 123/90.15; 73/117.3

(58) Field of Classification Search ................ 701/114, 701/102, 101, 115; 73/116, 117.3; 123/90.15
See application file for complete search history.

(56) References Cited

U.S. PATENT DOCUMENTS

| | | | | | |
|---|---|---|---|---|---|
| 4,577,598 | A | * | 3/1986 | Ma | 123/90.18 |
| 4,616,606 | A | * | 10/1986 | Ma | 123/90.17 |
| 5,218,935 | A | | 6/1993 | Quinn, Jr. et al. | |
| 6,101,993 | A | | 8/2000 | Lewis et al. | |
| 6,868,833 | B2 | * | 3/2005 | Friedrich et al. | 73/116 |

FOREIGN PATENT DOCUMENTS

| | | | | |
|---|---|---|---|---|
| DE | 101 08 055 | C1 | | 8/2002 |
| EP | 1 201 886 | A1 | | 5/2002 |
| GB | 2 293 894 | A | * | 10/1996 |
| JP | 9-280084 | A | * | 10/1997 |

* cited by examiner

*Primary Examiner*—Hieu T. Vo

(57) ABSTRACT

The invention relates to an internal combustion engine comprising a crankshaft, a camshaft and an adjusting device, which is used to adjust the phase position of the camshaft in relation to the crankshaft. The phase position is determined in accordance with a detected crankshaft angle and a recorded camshaft angle. A filter coefficient of a filter is determined in accordance with the amplitude of an oscillation of the phase position and the modification of said phase position. A filtered phase position of the determined phase position is calculated using the filter.

11 Claims, 3 Drawing Sheets

METHOD AND DEVICE FOR DETERMINING THE PHASE POSITION OF A CAMSHAFT OF AN INTERNAL COMBUSTION ENGINE

CROSS REFERENCE TO RELATED APPLICATION

This application is the U.S. National Stage of International Application No. PCT/EP2004/052326, filed Sep. 27, 2004 and claims the benefit thereof. The International Application claims the benefits of European Patent applications No. 10347516.8 EP filed Oct. 13, 2003, all of the applications are incorporated by reference herein in their entirety.

FIELD OF THE INVENTION

The invention relates to a method and device for determining the phase position of a camshaft of an internal combustion engine.

BACKGROUND OF THE INVENTION

A known internal combustion engine has a crankshaft which is driven by the pistons of the cylinders of the internal combustion engine using connecting rods. In addition, a camshaft is provided on which cams are embodied for driving gas inlet and gas exhaust valves of the internal combustion engine. The camshaft is connected to the crankshaft using a connection element and is driven by this element. More stringent legal regulations with regard to the emission of harmful substances in the case of internal combustion engines require effective measures for reducing the emission of harmful substances. Nitrogen oxide emissions (NOX) can be reduced very effectively by recirculation of the exhaust gas in the combustion chambers of the cylinders of the internal combustion engine. By means of the recirculated exhaust gases in the combustion chamber, the peak temperature of the combustion of the air/fuel mixture is lowered, which then reduces the nitrogen oxide emissions.

An exhaust gas recirculation can be reached very easily in the internal combustion engine by means of a so-called internal exhaust gas recirculation system. In the case of an internal exhaust gas recirculation process, the crankshaft position is set according to the desired exhaust gas recirculation rate, and while doing so, the gas inlet valve releases the inlet to the cylinder and the gas exhaust valve the exhaust to which an exhaust gas port is routed. This crankshaft angle position is often also called the valve overlap.

From DE 101 08 055 C1 an internal combustion engine with a camshaft for which the phase position can be adjusted to the crankshaft by using a setting mechanism is known. The setting mechanism can be controlled hydraulically.

Depending on which point in the operation of the internal combustion engine has been reached, very different exhaust gas recirculation rates must be set. This also applies to the different operating modes in the same way as they, for example, occur in internal combustion engines with injection valves which meter out the fuel directly in the combustion chamber of the cylinder. These operating modes are, for example, a layered or a homogenous operation. Therefore, as a result it is a requirement to set the exhaust gas recirculation rates very quickly from high to low and vice versa and at the same time to set the exhaust gas recirculation rates very accurately. DE 101 08 055 C1 discloses that the phase position is determined in accordance with the camshaft angle and the crankshaft angle.

SUMMARY OF THE INVENTION

The object of the invention is to create a method and a device which respectively make possible an accurate detection of the phase position between a camshaft and a crankshaft of an internal combustion engine.

The object of the invention is achieved by the features of the independent claims.

Advantageous embodiments of the invention are defined in the subclaims.

The outstanding features of the invention are a method and a corresponding device for determining the phase position of a camshaft of an internal combustion engine with a crankshaft, a camshaft and a setting mechanism by means of which the phase position of the camshaft can be adjusted in relation to the crankshaft. A phase position is determined in accordance with a detected crankshaft angle and a recorded camshaft angle. A filter coefficient of a filter is determined in accordance with the amplitude of an oscillation of the phase position and the modification of said phase position. A filtered phase position of the determined phase position is calculated using the filter.

The invention is based on the knowledge that, in particular in the case of internal combustion engines in which the camshaft or camshafts act on a few two-way gas valves, as is the case for example in a V6 internal combustion engine with two camshafts to which the two-way gas valves or only the gas inlet valves of three cylinders are allocated in each case, strong oscillations overlapping the rotations of the camshaft occur on the basis of valve movements of the two-way gas valves. This then leads to an inaccurate detection of the phase position and therefore, in the event of the phase position being regulated, to the regulation quality being reduced especially during steady-state operation of the regulation.

By filtering the phase position according to the invention, it is possible that by suitably selecting the filter coefficients both a very good dynamic behavior can be guaranteed when a desired phase position is set and the steady-state accuracy improved when the phase position is set in accordance with the amplitude of an oscillation of the phase position and the modification of said phase position.

In an advantageous embodiment of the invention the filtering is undertaken by means of a non-recursive filter of the first order. This has the advantage that the filtering process is very easy to implement.

In a further advantageous embodiment of the invention, the modification of the phase position is filtered and the filter coefficient is determined in accordance with the filtered modification of said phase position. This has the advantage that the phase position can be determined both easily and very accurately.

In a further advantageous embodiment of the invention, the modification of the phase position is filtered in accordance with the rotation and/or an oil temperature. This has the advantage that the rotation and/or the oil temperature are characteristics for the pumping capacity of a hydraulic pump and with that for a possible dynamic behavior of a hydraulically-activated setting mechanism.

In a further advantageous embodiment of the invention, the amplitude of the oscillation of the phase position is filtered and the filter coefficient is determined in accordance with the filtered amplitude of an oscillation of the phase position. This has the advantage that the phase position can be determined both easily and very accurately.

In a further advantageous embodiment of the invention, the amplitude is filtered in accordance with the rotation and/or an oil temperature. This has the advantage that the rotation and/or the oil temperature are characteristics for the pumping capacity of a hydraulic pump and thereby for a possible dynamic behavior of a hydraulically-activated setting mechanism.

In a further advantageous embodiment of the invention, the reducing of the filter coefficient within a predetermined time or within a predetermined crankshaft angle segment is limited to a predetermined threshold value. As a result of this, in the case of a sudden change from an increasing phase position to a decreasing phase position or vice versa it is possible to prevent the filter coefficient being reduced from a high value to a low value for the short-term which then results in a strong filtering of the phase position which is undesirable this type of non-stationary phase position reponse.

In a further advantageous embodiment of the invention, filtering is undertaken by means of a non-recursive filter of the second order or higher. As a result of this, the phase position can be filtered even more accurately.

BRIEF DESCRIPTION OF THE DRAWINGS

Embodiments of the invention are explained below on the basis of the accompanying drawings and figures. They are as follows.

DETAILED DESCRIPTION OF THE INVENTION

Elements with the same construction and function are identified in all the FIGS. by the same reference symbols.

Figure 1:
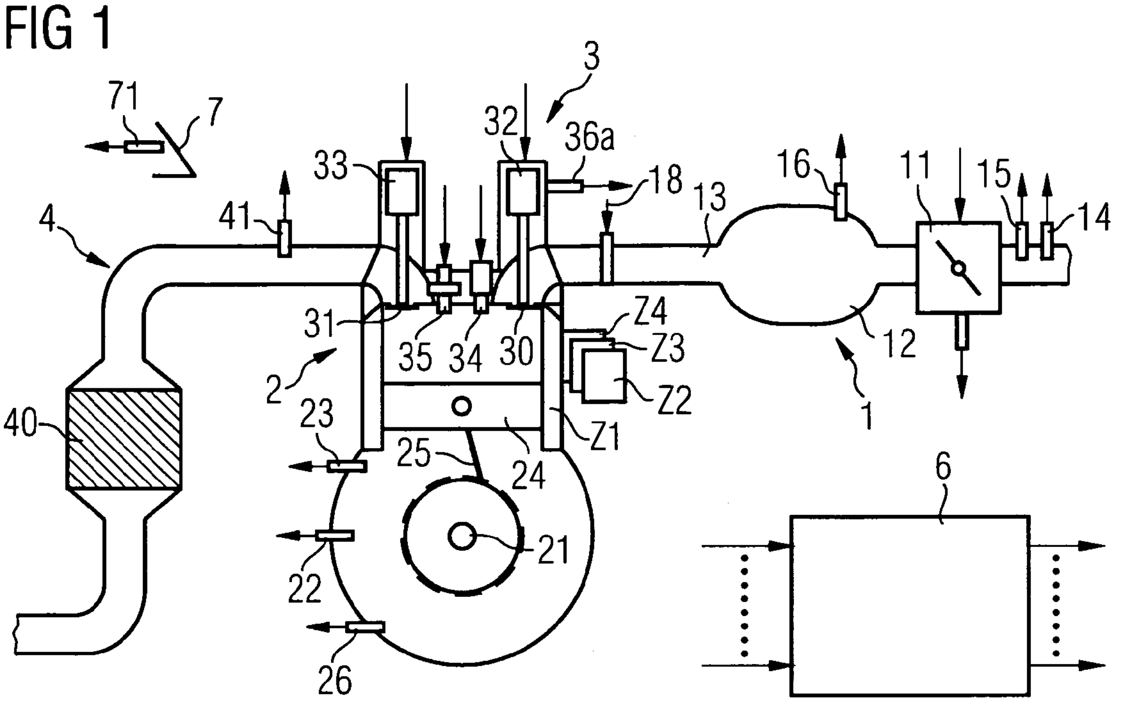
FIG. 1 an internal combustion engine with a control unit.

An internal combustion engine (FIG. 1) includes an inlet tract 1, an engine block 2, a cylinder head 3 and an exhaust gas tract 4. The inlet tract preferably includes a throttle valve 11, a manifold 12 and an inlet pipe 13 which is routed to a cylinder Z1 via an inlet port in the engine block. The engine block also includes a crankshaft 21 which is connected to the piston 24 of cylinder Z1 by means of a connecting rod 25.

The cylinder head includes a valve train with an inlet valve 30, an exhaust valve 31 and valve gears 32, 33. The gas inlet valve 30 and the gas exhaust valve 31 are driven by means of a camshaft 36 (see FIG. 2) on which cams 39 are embodied for driving the gas inlet valve 30 or the gas exhaust valve 31 or, if required, by means of two camshafts in which case one is allocated to the gas inlet valve 30 and one to the gas exhaust valve 31.

The drive for the gas inlet valve 30 and/or the gas exhaust valve 3, apart from by the camshaft 36 preferably includes a setting mechanism 37 which, on the one hand, is connected to the camshaft 36 and, on the other hand, to the crankshaft 21, e.g. via gear wheels which are connected to one another via a chain. With the setting mechanism 37 it is possible to adjust the phase position between the crankshaft 21 and the camshaft 36. The arrangement of the gear wheels and the chain form the connection element.

Figure 2:
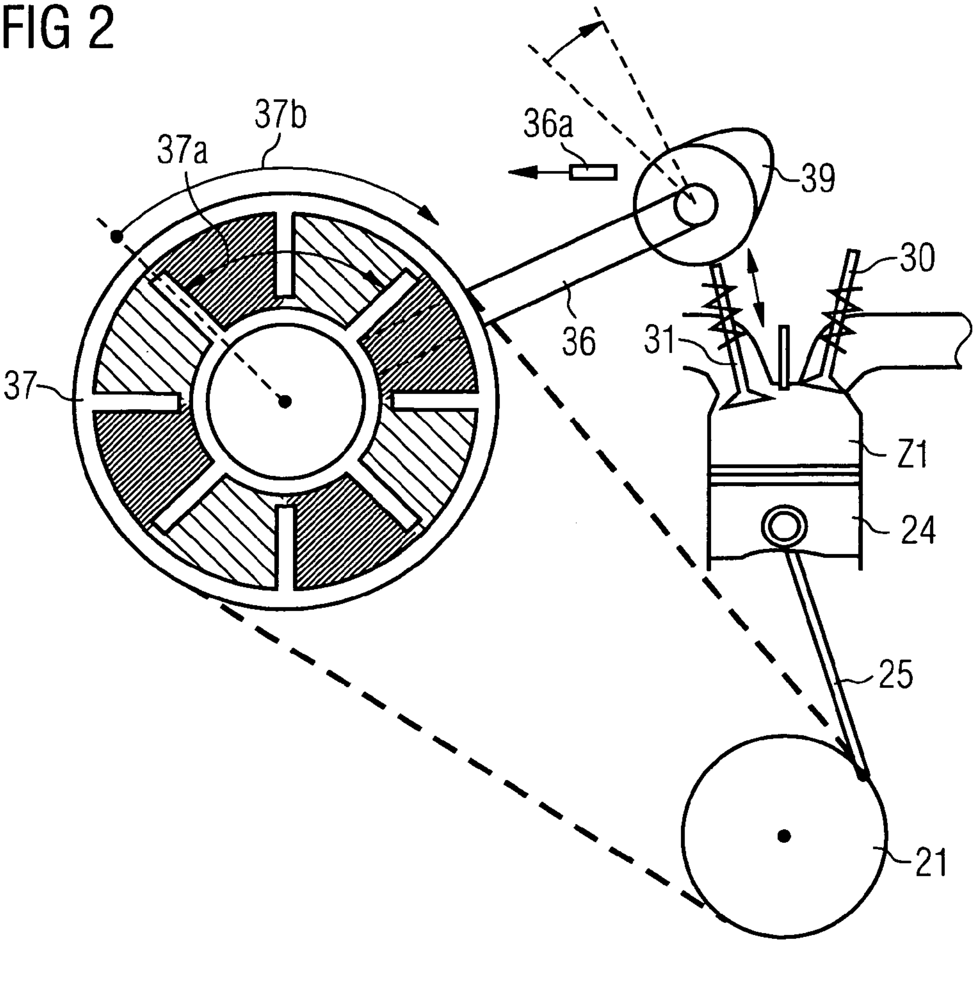
FIG. 2 a further view of the parts of the internal combustion engine.

This is done in the present embodiment by increasing the hydraulic pressure in the high-pressure chambers 37*a* of the setting mechanism 37 or by decreasing the corresponding pressure depending the direction in which the adjustment should is to be made. The possible adjustment range is shown in FIG. 2 with the arrow 37*b*.

For example, if two camshafts 36 are provided it is only possible to allocate one camshaft 36 to the setting mechanism 37 while the other camshaft is driven directly by means of the connection element of crankshaft 21. In this case, the valve overlap of the gas inlet valve 30 and the gas exhaust valve 31 can be changed, i.e. the crankshaft angle position, during which both an inlet and an exhaust of the cylinder are released. It is also possible to modify the valve overlap if two separate setting mechanisms 37 are allocated to two camshafts 36.

The cylinder head 3 (FIG. 1) also includes both an injection valve 34 and a spark plug 35. Alternatively, the injection valve can also be arranged in the inlet pipe 13.

The exhaust gas tract 4 includes a catalytic converter 40.

In addition, a control unit 6 is provided to which sensors have been allocated, said sensors detecting the different measured quantities and in each case determining the measured value of the measured quantity. The control unit 6 determines, in accordance with at least one of the measured quantities, the controlling variables which are then converted into one or more adjusting signals for controlling the final control elements by means of corresponding actuators.

The sensors are a pedal position indicator 71 which detects the position of an acceleration pedal 7, an air mass flow meter 14 which detects an air mass flow upstream of the throttle valve 11, a temperature sensor 15 which detects the inlet air temperature, a pressure sensor 16 which detects the inlet pipe pressure MAP, a crankshaft angle sensor 22 which detects a crankshaft angle CRK to which a rotational speed is allocated N, a further temperature sensor 23 which detects a coolant temperature, a camshaft angle sensor 36*a* which detects the camshaft angle CAM, a further temperature sensor 25 which detects an oil temperature TOIL and an oxygen sensor 41 which detects a residual oxygen content of the exhaust gas. Depending on the embodiment of the invention, there can be any subset of the mentioned sensors or even additional sensors.

The final control elements are, for example, the throttle valve 11, the gas inlet and the gas exhaust valves 30, 31, the injection valve 34, the spark plug 35 and the setting mechanism 37.

In addition to the cylinder Z1, the internal combustion engine can also have other cylinders Z2–Z4 to which corresponding final control elements are then also allocated.

A program for determining the phase position PH between the crankshaft 21 and the camshaft 36 is started in a step S1 (FIG. 1) in which variables are initialized, if required.

In a step S2, the phase position PH is determined in accordance with the crankshaft angle CRK and the camshaft angle CAM. This, for example, takes place by counting the tooth flanks of a crankshaft angle transmitter of the crankshaft angle sensor 22 referred to a reference position on the camshaft 36 and subsequently converting to the phase position PH.

In a step S4, the amplitude AMP of an oscillation of the phase position PH is determined. A letter n in brackets in each case means a value detected or determined in the current calculation cycle of the program. Accordingly, an n-1 in brackets means a value determined or detected in the last calculation cycle of the program.

The current amplitude AMP(n) of the oscillation of the phase position PH is determined by forming the difference between the current phase position PH(n) and the phase position PH(n-1) determined in the preceding calculation cycle.

In a step S6, a filtered amplitude AMP_FIL(n) is determined by filtering the currently determined amplitude AMP (n) with a filter of the first order. The filter of the first order has a filter coefficient FF1 which has either been predetermined permanently, but is determined advantageously beforehand in a step S22 in accordance with the rotational speed N and/or the oil temperature TOIL. This is preferably done by means of a characteristic or a performance graph and indeed by a characteristic or performance graph interpolation. The characteristic or the performance graph is determined by means of corresponding attempts on an engine test bench or by means of simulations.

In a step S8, the current modification DELTA(n) of the phase position PH is determined by forming the difference between the current phase position PH(n) and the preceding phase position PH(n1).

In a step S10, a filtered modification DELTA_FIL(n) is determined by means of a filter of the first order by filtering the current modification DELTA(n). The filter coefficient FF2 of the second filter can be predetermined permanently, but is preferably determined beforehand in a step S24 in accordance with the rotational speed N and/or an oil temperature TOIL and indeed also in a step S22 preferably by means of a characteristic or a performance graph interpolation.

In a step S12, the current filter coefficient FF3(n) is then determined for another filter and indeed depending on the filtered amplitude AMP_FIL(n) and the filtered modification DELTA_FIL(n) of the phase position PH. This preferably takes place by means of a performance graph interpolation from a performance graph which was determined beforehand by means of corresponding attempts on an engine test bench. The performance graph values are preferably selected in such a way that, in cases, in which the filtered amplitude AMP_FIL(n) of an oscillation of the phase position is more or less the same as the filtered modification DELTA_FIL(n) of the phase position PH, said performance graph values are relatively the same, for example, have the value 0.7. If, on the other hand, the filtered modification DELTA_FIL(n) almost has the value zero and the filtered amplitude AMP-_FIL(n) clearly has a value exceeding zero, the performance graph values are preferably selected to be very small and indeed, for example, with values ranging from 0.1 to 0.2.

In a step S18, a filtered current phase position PH_FIL(n) is then determined with the filter coefficients FF3 by filtering the current phase position PH(n) using a filter of the first order.

Preferably, after step S12, processing is continued in a step S14 in which a test is performed to determine whether or not the difference of the filter coefficients FF3(n-1) which was determined in the preceding calculation cycle and the currently determined filter coefficient FF3(n) exceeds a predetermined threshold value SW. If this is not the case, processing is immediately continued in step S18.

On the other hand, if the condition of step S14 has been met, then in a step S16, the difference of the filter coefficients FF3(n-1) and the threshold value SW determined in the preceding calculation cycle is allocated to the current filter coefficients FF3(n). As a result of this, it is brought about that the filter coefficient FF3 changes from the one calculation cycle to the next calculation cycle, but not exceeding the predetermined threshold value SW. As a result of this, in the case of a sudden change from an increasing phase position PH to a decreasing phase position PH or vice versa it is possible to prevent that the filter coefficient FF3 is reduced from a high value to a low value for the short-term which then results in a strong filtering of the phase position PH which is not desired in the case of such an unsteady course of the phase position PH.

The program holds out for a predetermined waiting period T_W in a step S20, before processing is continued again in a step S2. Alternatively, the program can also hold out for a predetermined crankshaft angle in a step S20 before processing is continued again in step S2. The reprocessing of steps S2 to S18 then conforms to the next calculation cycle.

Figure 3:
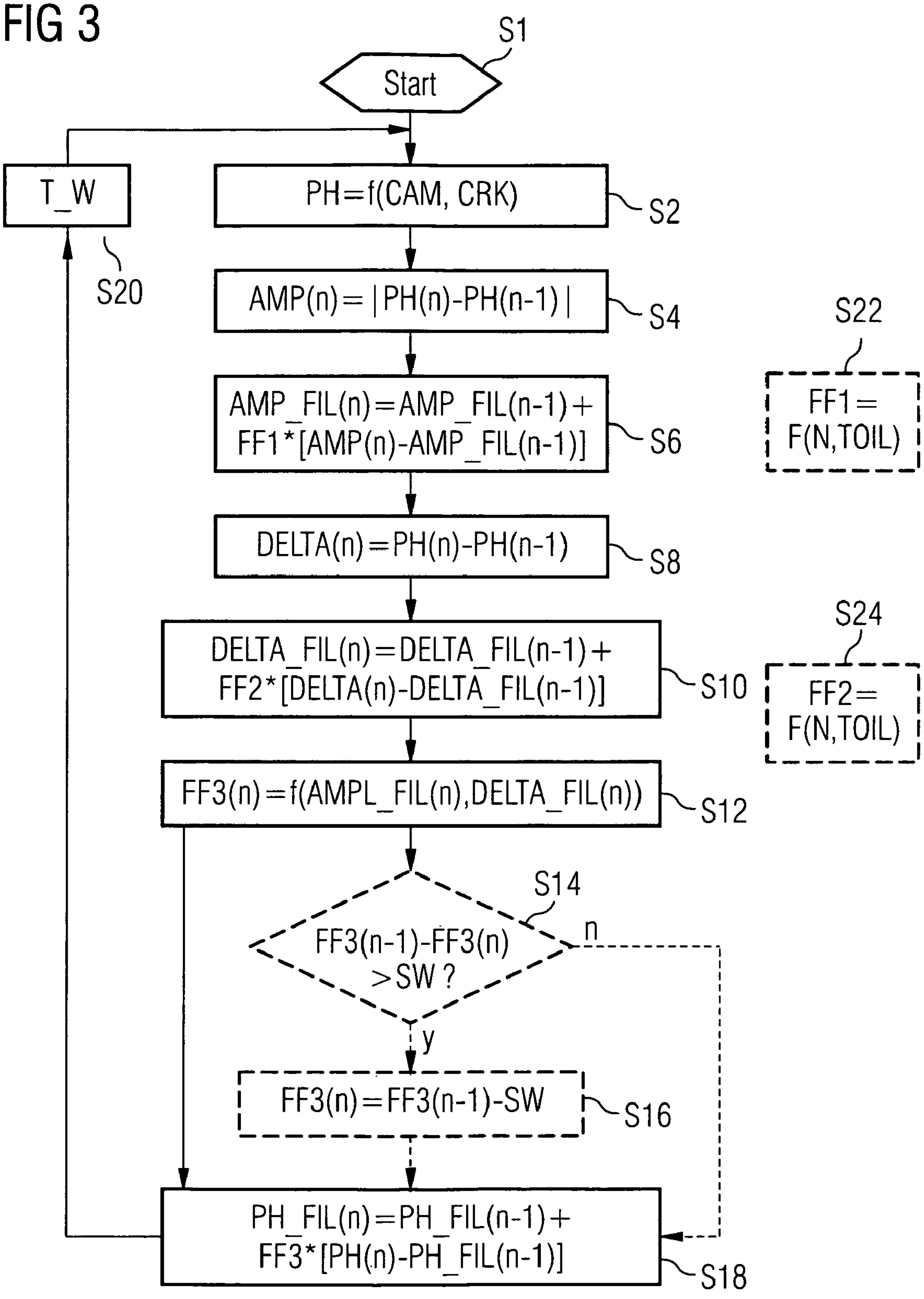
FIG. 3 a flow diagram of a program for determining the phase position of a camshaft in relation to the crankshaft of an internal combustion engine according to FIG. 1 and FIG. 2, and FIG. 4 a flow diagram of a program for setting the phase position between the camshaft and the crankshaft.
Figure 4:
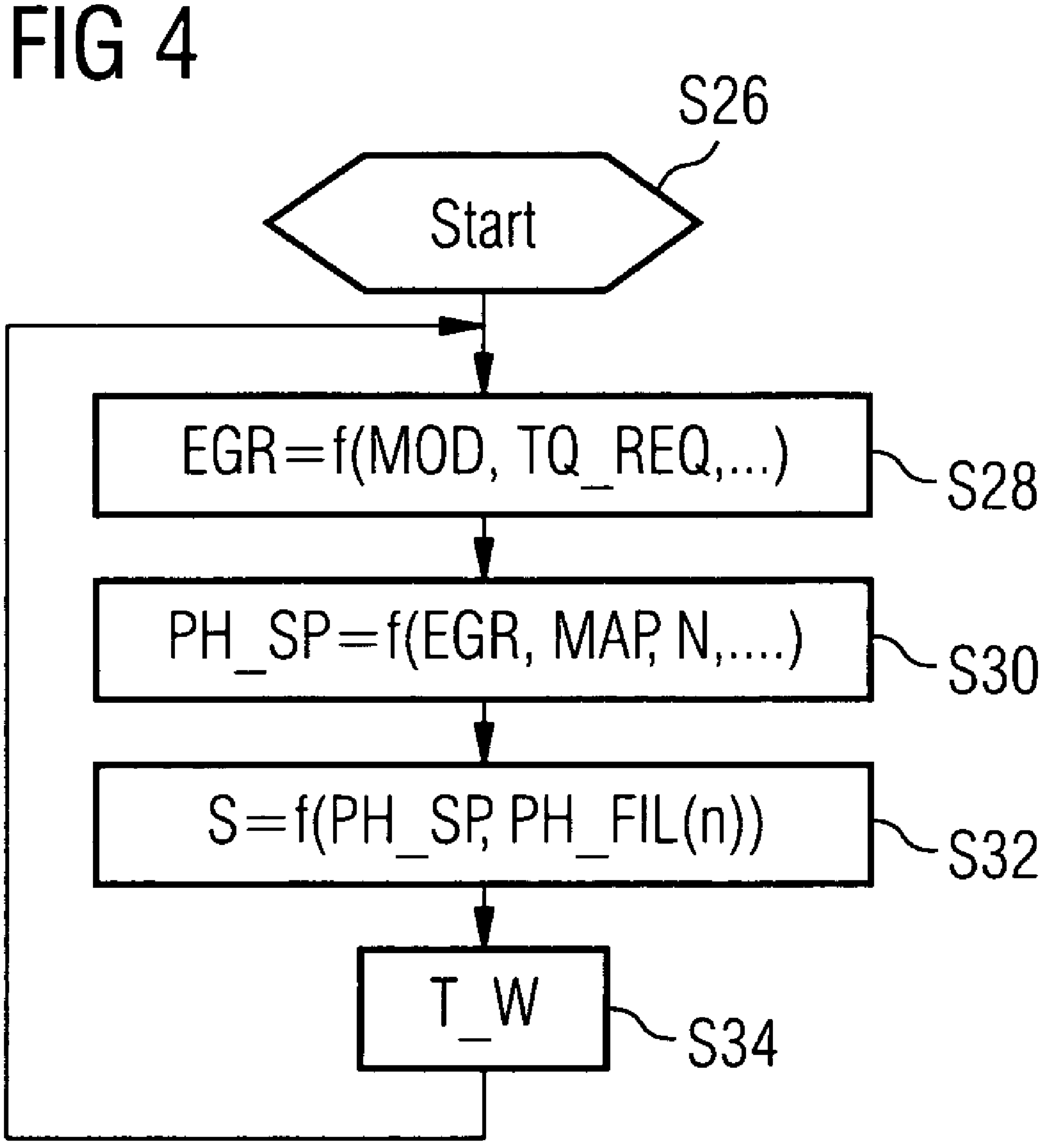

Parallel to determining the filtered phase position PH_FIL, a further program is processed in the program according to FIG. 3 which determines a setting signal S (FIG. 4) for controlling the setting mechanism 37.

The program is started in a step S26 and preferably close to the time that the internal combustion engine is started. An exhaust gas recirculation rate EGR is determined in a step S28 and indeed in accordance with a required torque TQ_REQ which should be generated by the internal combustion engine and which is preferably determined in accordance with the position of the acceleration pedal and, if required, other torque requirements such as those of an ABS system or an ESP system. The exhaust gas recirculation rate is advantageously also determined in accordance with an operating mode MOD of the internal combustion engine which, for example, can be a layered or a homogenous operation of the internal combustion engine. The exhaust gas recirculation rate EGR can also be determined in accordance with other operating variables of the internal combustion engine.

In a step S30, a desired value PH_SP of the phase position is then determined in accordance with the exhaust gas recirculation rate EGR, the inlet pipe pressure MAP and in accordance with the rotational speed N and, if required, other operating variables.

In a step S32, the adjusting signal S for activating the setting mechanism 37 is then determined in accordance with the desired value PH_SP of the phase position and the filtered phase position PH_FIL(n). This is preferably done by means of a regulator which is embodied as a P, PI or PID regulator.

The setting mechanism 37 is then activated with the adjusting signal S. After the step S32, the program then holds out for the predetermined waiting period T_W in a step S34. Alternatively, the program can also hold out in the step S34 for a predetermined crankshaft angle before processing is continued again in step S28.

It is possible that, by suitably selecting the filter coefficients FF3, the control accuracy of the regulator of step S28 can be improved to a great extent and at the same time a good dynamic behavior and high steady-state control accuracy can be obtained. This leads to the exhaust gas recirculation rate EGR in the cylinder Z1 being able to be set very quickly and the steady-state accuracy improved, which then decisively contributes to lower nitrogen oxide emissions.

The invention claimed is:

1. A device for determining a phase position of a camshaft of an internal combustion engine, comprising:

a crankshaft shaft;

a camshaft;

a setting mechanism for setting the phase position of the camshaft such that the camshaft can be adjusted in relation to the crankshaft;

a first means provided for determining the phase position in accordance with a detected crankshaft angle and a recorded camshaft angle;

a second means provided for determining a filter coefficient of a filter in accordance with an amplitude of an oscillation of the phase position and the modification of said phase position; and a third means provided for determining a filtered phase position of the determined phase position by using the filter.

2. A method for determining a phase position of a camshaft of an internal combustion engine with a crankshaft, a camshaft and a setting mechanism such that a phase position of the camshaft can be adjusted in relation to the crankshaft, comprising:

determining the phase position in accordance with a detected crankshaft angle and a recorded camshaft angle;

determining a filter coefficient of a filter in accordance with an amplitude of an oscillation of the phase position and the modification of said phase position; and determining a filtered phase position of the determined phase position by the filter.

3. The method according to claim 2, wherein the filtering takes place by a non-recursive filter of the first order.

4. The method according to claim 2, wherein the modification of the phase position is filtered and the filter coefficient is determined in accordance with the filtered modification of said phase position.

5. The method according to claim 4, wherein the modification of the phase position is filtered in accordance with the rotation and an oil temperature.

6. The method according to claim 4, wherein the modification of the phase position is filtered in accordance with the rotation or an oil temperature.

7. The method according to claim 2, wherein the amplitude of the oscillation of the phase position is filtered and the filter coefficient is determined in accordance with a filtered amplitude of the oscillation of the phase position.

8. The method according to claim 7, wherein the amplitude is filtered in accordance with the rotation and the oil temperature.

9. The method according to claim 7, wherein the amplitude is filtered in accordance with the rotation or the oil temperature.

10. The method according to claim 2, wherein reducing the filter coefficient within a predetermined moment in time or within a predetermined crankshaft angle section is limited to a predetermined threshold value.

11. The method according to claim 2, wherein filtering is undertaken by a non-recursive filter of the first order.

* * * * *